(12) United States Patent
Ribi et al.

(10) Patent No.: US 12,272,143 B2
(45) Date of Patent: Apr. 8, 2025

(54) TIME-OF-FLIGHT BASED 3D SURVEILLANCE SYSTEM WITH FLEXIBLE SURVEILLANCE ZONE DEFINITION FUNCTIONALITY

(71) Applicant: LEICA GEOSYSTEMS AG, Heerbrugg (CH)

(72) Inventors: Markus Ribi, Heerbrugg (CH); Sandra Tobler, Berneck (CH); Adam Bajric, Kirchberg (CH); Carl-Thomas Schneider, Zug (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 185 days.

(21) Appl. No.: 18/093,688

(22) Filed: Jan. 5, 2023

(65) Prior Publication Data

US 2023/0215179 A1    Jul. 6, 2023

(30) Foreign Application Priority Data

Jan. 6, 2022 (EP) ................................. 22150450.9

(51) Int. Cl.
*G06V 20/52* (2022.01)
*G01S 17/89* (2020.01)
(Continued)

(52) U.S. Cl.
CPC ............ *G06V 20/52* (2022.01); *G01S 17/89* (2013.01); *G06F 3/04815* (2013.01); *G06T 7/20* (2013.01);
(Continued)

(58) Field of Classification Search
CPC .... G06V 20/52; G06V 20/44; G06V 2201/07; G01S 17/89; G01S 17/10; G01S 17/42;
(Continued)

(56) References Cited

U.S. PATENT DOCUMENTS

| | | | | |
|---|---|---|---|---|
| 5,886,700 A | * | 3/1999 | Di Pippo | G06F 3/04815 715/810 |
| 6,781,597 B1 | * | 8/2004 | Vrobel | G06T 19/20 715/848 |
| 11,087,528 B1 | * | 8/2021 | Couture-Gagnon | G06F 30/13 |
| 11,935,377 B1 | * | 3/2024 | Xu | G08B 13/19643 |
| 11,989,827 B2 | * | 5/2024 | Cheng | G06T 17/05 |

(Continued)

OTHER PUBLICATIONS

European Search Report dated Jul. 11, 2022 as received in Application No. 22150450.9.

*Primary Examiner* — Fernando Alcon
(74) *Attorney, Agent, or Firm* — Maschoff Brennan

(57) ABSTRACT

A surveillance system for detecting and/or characterizing movement of a monitored infrastructure. An improved compromise between tight zone surveillance and number of false alarms is provided by an improved control of a 3D surveillance device. An input functionality is provided for a user to define a 3D subzone within a 3D environment model. A change functionality allows the user to generate a redefined subzone by dragging one of the corner points of the 3D subzone to a different position within a 3D visualization of the 3D environment model, whereby the shape of the 3D subzone is distorted. The input functionality and the change functionality are used to provide to the 3D surveillance device spatial parameters associated with the redefined subzone and the 3D surveillance device is caused to generate an action in case a movement within the redefined subzone is detected by means of the 3D measurement data.

23 Claims, 9 Drawing Sheets

(51) Int. Cl.
*G06F 3/04815* (2022.01)
*G06T 7/20* (2017.01)
*G06T 17/00* (2006.01)
*G06V 20/40* (2022.01)

(52) U.S. Cl.
CPC .............. *G06T 17/00* (2013.01); *G06V 20/44* (2022.01); *G06V 2201/07* (2022.01)

(58) Field of Classification Search
CPC .......... G01S 17/86; G01S 17/08; G01S 17/88; G06F 3/04815; G06T 7/20; G06T 17/00; G08B 13/181; G08B 13/19606; G08B 13/1968; G08B 13/196; G08B 13/19682; H04N 13/275
See application file for complete search history.

(56) References Cited

U.S. PATENT DOCUMENTS

| | | | |
|---|---|---|---|
| 2011/0122247 A1 | 5/2011 | Kim | |
| 2014/0218356 A1* | 8/2014 | Distler | G06T 19/20 345/419 |
| 2015/0331970 A1* | 11/2015 | Jovanovic | G06T 15/10 703/1 |
| 2018/0095276 A1* | 4/2018 | Ng-Thow-Hing | G02B 27/017 |
| 2018/0096576 A1 | 4/2018 | Anderholm | |
| 2020/0150637 A1 | 5/2020 | Yates | |
| 2021/0254308 A1 | 8/2021 | Thibblin | |
| 2022/0012476 A1* | 1/2022 | Furukawa | G06T 7/596 |
| 2022/0342200 A1* | 10/2022 | Almeida Loya | B81B 3/0018 |
| 2023/0237712 A1* | 7/2023 | Mason | G06T 7/20 345/619 |

* cited by examiner

TIME-OF-FLIGHT BASED 3D SURVEILLANCE SYSTEM WITH FLEXIBLE SURVEILLANCE ZONE DEFINITION FUNCTIONALITY

BACKGROUND

The present disclosure relates to a surveillance system for detecting and/or characterizing movement within or around a monitored infrastructure, e.g. a building or facility to be monitored for intruder detection.

By way of example, surveillance systems are used to monitor neuralgic points within a city, such as railway stations, airports, city parks, or otherwise busy public places. Furthermore, surveillance systems are used to monitor or safeguard restricted or dangerous areas, e.g. industrial plants, construction sites, or business complexes as well as private homes.

By way of another example, surveillance systems are used to support operation of a facility, e.g. supervision of a warehouse or a car park.

Starting from an initially passive observation, i.e. the mere provision of a remote representation of a scene to be monitored by a human system operator, modern surveillance systems have increasingly evolved into active systems that can autonomously identify objects and/or situations related to the scene to be monitored, e.g. for automatically raising an alarm or for flagging a scene to be reviewed by a human operator.

Often, a distributed network of cameras is used, wherein live video streams of a number of cameras is displayed on a set of monitors and/or wherein different camera views are selectable by an operator of the surveillance system, e.g. the security personnel of a railway station or a business complex. Furthermore, modern systems may be configured for automatically identifying and tracking persons or otherwise moving objects, e.g. cars, in order to notify the operator of any suspicious movement.

In particular, the automatically generated tracking information is used to hand-off moving objects from one camera to another camera in case the moving object leaves the field of view of the first camera, i.e. the path of the object can be automatically followed within the distributed network of cameras.

In addition to displaying essentially unedited footage of the cameras and path information, surveillance results are often embedded as live textures in an integrated 3D model of the environment such that a situation may be inspected from arbitrary perspectives, e.g. independent of the movement of a person or object.

Modern surveillance systems often make use of a variety of different surveillance sensors. For example, thermal cameras may be used for monitoring an infrastructure during night and/or for identifying objects or critical events based on temperature, e.g. for detecting fire outbreaks or the status of vehicle or other machine engines.

By way of another example, lidar (light detection and ranging) devices and/or light barriers provide for intrusion and/or movement detection, wherein moving objects are detected as they cross observing planes within the infrastructure. However, compared to camera imaging spatial coverage by lidar devices and/or light barriers is often limited, e.g. wherein different observing planes are only placed at entrances, e.g. doors and windows, or wherein different observing planes are at least separated by several meters.

Particular problems of prior art surveillance systems relate to the handling of changing environmental conditions such as changes in ambient light, and/or to adapting to modifications of the environment, wherein placement of allowed objects have to be distinguished from placement of disallowed objects within the infrastructure to be monitored.

These requirements led to a new class of surveillance systems using 3D coordinate measurement units which implement techniques and principles known from the technical field of surveying, e.g. principles used by high-end laser scanning stations such as the Leica RTC360 or the Leica BLK360 for the precise three-dimensional geometric measuring of an environment. By way of example, the Leica BLK247 is an exemplary example of an intelligent 3D surveillance system of this new class. These new 3D surveillance systems use a 3D coordinate measurement unit that is configured to provide 3D coordinate measurement data based on a time-of-flight principle in an all-round view. For example, the 3D coordinate measurement unit provides a field-of-view of 360 degrees about a first axis and at least 130 degrees about a second axis perpendicular to the first axis, wherein the 3D coordinate measurement data are generated with a point acquisition rate of at least 150'000 points per second. For example, the Leica BLLK247 provides a point acquisition rate of 200'000 points per second in a field-of-view of 360 degrees about the first axis and 270 degrees about the second axis.

Thanks to the use of a time-of-flight principle, detection of any 3D change and object tracking under any light conditions, e.g. under bright back light and in the darkness, are provided. Radiation wavelengths in the infrared wavelength range can be used for the time-of-flight measurement, which allows covering the 3D coordinate measurement unit with materials opaque for the visual wavelength range, thus details about the used 3D surveillance technology are concealed for a human observer. Therefore, discreet and noiseless 3D surveillance invisible to the eye can be provided.

Moreover, thanks to the time-of-flight based 3D coordinate measurement unit and the use of 3D-based object classification the sensitivity and spatial resolution for object detection and object recognition is increased. By way of example, spatial resolution and object recognition can in principle be tuned such that objects having dimensions at the centimeter range or even smaller are unambiguously detected and identified.

The all-round view and the way of data acquisition, e.g. wherein the 3D coordinate measurement data are intrinsically generated with respect to a common coordinate system, provide for straight-forward positional referencing of events detected by the surveillance data (the 3D coordinate measurement data) within the environment. For example, the 3D surveillance device may be used to both generate a digital model of the environment and to monitor events within this digital model by making use of the same 3D coordinate measurement unit. This allows for flexible definition and later adaption of a particular surveillance zone (a subzone of the all-round view) or a plurality of different subzones to be monitored by the same 3D surveillance device without having to move the 3D surveillance device.

Typically, an environment comprises surveillance zones with different security levels, e.g. with different access authorizations, wherein possible "holes" of the security net through which an intruder could enter undetected can particularly occur in transition areas between different surveillance zones. Thus, it is typically beneficial to define transition between zones as small as possible, e.g. such that different zones are arranged as close to each other as possible.

New issues arise because of the increased sensitivity and spatial resolution. Even small and slow movements are detected and may raise false alarms. For example, the complex to be monitored could comprise or border a green area, e.g. a forest, a grain field, or an area with ornamental plants. The increased sensitivity and spatial resolution now even raises alarms due to detection of movement of the vegetation into the protected area caused by wind. Even the growth of plants themselves could lead to increased alarms. For example, a surveillance zone typically ranges close to the ground, e.g. to prevent somebody crouching "underneath" the surveillance zone (between the ground and the surveillance zone). However, in case of a green area, the ground can "grow into" the surveillance zone and thereby raise a false alarm, e.g. in case plants are moved by wind. By way of another example, when monitoring a border wall, birds may frequently land and move on top of the wall, which could raise an alarm under the presumption of a potential intruder climbing over the wall.

Therefore, some tolerance area between the protected zone and the environment around the zone is used to prevent frequent false alarms. However, this reduces tightness of the shielding.

SUMMARY

It is an object of the present disclosure to provide improved surveillance of an environment, which overcomes the deficiencies of the prior art.

A particular object is to provide a surveillance system, which allows an optimal compromise between tight zone surveillance and number of false alarms, e.g. due to intrusion of a transition area between different surveillance zones.

A further object is to provide a surveillance system, which reduces false surveillance zone definition, e.g. due to incorrect operation by an inexperienced user.

These objects are achieved by the realization of at least part of the characterizing features described herein.

The disclosure relates to a method for controlling a 3D surveillance device configured to generate 3D measurement data of a spatial volume of an environment and to monitor the spatial volume of the environment using the 3D measurement data and a 3D environment model.

By way of example, the 3D surveillance device comprises a 3D coordinate measurement unit configured to capture a spatial volume of the environment by 3D coordinate measurement data based on a time-of-flight principle. For detecting an object within the monitored spatial volume of the environment, the 3D surveillance device may further comprise an object detector configured for detecting an object within a defined subarea of the monitored environment based on 3D coordinate measurement data of the 3D surveillance device, e.g. based on 3D change detection.

For example, the 3D surveillance device is embodied to be placed in a corner of a room and is foreseen to monitor a spatial volume within a field-of-view of 90 degrees times 90 degrees (to generate the 3D coordinate measurement data with a field-of-view of 90 degrees times 90 degrees). In case the 3D surveillance device is foreseen for mounting on a wall, it may be embodied to provide monitoring of a field-of-view of 90 degrees times 180 degrees. In a further embodiment, e.g. wherein the 3D surveillance device is foreseen for mounting on the ceiling, the 3D coordinate measurement unit provides a field-of-view of 360 degrees times 90 degrees. By way of example, the 3D coordinate measurement unit is configured to provide a field of view of 360 degrees about a first axis (e.g the vertical axis) and at least 130 degrees about a second axis perpendicular to the first axis, e.g. 270 degrees about the second axis.

In particular, the 3D surveillance device is configured to provide for generation of a 3D point cloud and an updating of the 3D point cloud at an update rate of at least one sample point of the 3D point cloud per second per angular field of view of half a degree in elevation by one degree in azimuth. For example, the 3D surveillance device is configured to generate 3D coordinate measurement data with a point acquisition rate of at least 150'000 points per second.

Therefore, the complete field-of-view is monitored by the 3D coordinate measurement device in essentially real time and an essentially real time representation of the surveilled infrastructure can be displayed to a user based on the 3D measurement data. In particular, the fast updating of the 3D point cloud provides for improved change detection based on the 3D measurement data.

The method comprises reading input data associated to the 3D surveillance device, wherein the input data provide coordinate information associated to a position of the 3D surveillance device within the 3D environment model. For example, the 3D environment model is provided in the form of a point cloud or in the form of a vector-file-model, e.g. a computer-aided design (CAD) model, wherein the position of the 3D surveillance device within the 3D environment model is derived by means of the coordinate information provided with the input data. Alternatively, or in addition, the 3D measurement data of the 3D surveillance device are used to generate the 3D measurement model, wherein the position of the 3D surveillance device is (e.g. intrinsically) known/provided by the 3D measurement data.

The input data are then used for generating on an electronic graphical display a graphical user interface which provides a 3D visualization of the 3D environment model, wherein the visualization comprises an indication of the position of the 3D surveillance device and, for example, a field-of-view of the 3D surveillance device. Thus, a user of the 3D surveillance device can inspect the environment and possible surveillance zones reachable for the 3D surveillance device. In a further step, an input functionality is provided via the graphical user interface, e.g. by means of a touch-screen control, wherein the user can define a 3D subzone within the 3D environment model. For example, the subzone is foreseen to be specifically monitored and/or to be treated differently with respect to the rest of the environment, e.g. wherein a minimum and/or a maximum size of an alarming object (and object that raises an alarm), a minimum and/or maximum speed of an alarming object, or a particular movement pattern to be compared to a movement of a detected object are defined. Furthermore, the subzone may be assigned a different point density or sensitivity and/or with a different repetition frequency to refresh a point cloud section represented by the subzone.

For example, the electronic graphical display is embodied by an external display, e.g. a display of a personal computer, a tablet, or a smartphone, wherein the 3D surveillance device is configured to establish a (wired or wireless) data and communication connection with the external display or with a computing unit associated to the external display. For establishing the data and communication connection, a variety of different technologies of the prior art may be used. For example, the connection may be implemented in a so-called "direct" fashion (device-to-device), e.g. by means of bluetooth or a peer-to-peer architecture, or the connection may be embodied in an "indirect" fashion, e.g. by means of a server-client architecture.

The 3D subzone has a shape of a 3D body, which is spanned by a connection of at least four corner points. Via the graphical user interface, a change functionality for a user is provided in order to generate a redefined subzone by dragging one of the corner points of the 3D subzone to a different position within the 3D visualization of the 3D environment model, whereby the shape of the 3D subzone is distorted. Spatial parameters associated with the redefined subzone within the 3D environment model are then provided to the 3D surveillance device and the 3D surveillance device is caused to generate an action, e.g. an alarm, in case a movement within the redefined subzone is detected by means of the 3D measurement data.

For example, the spatial parameters provide the 3D surveillance device with information to be able to recognize borders or the complete outline of the redefined subzone in order to derive whether a movement occurs within the redefined subzone or not. Alternatively, or in addition, the spatial parameters may provide a specific processing and assessment rule which allows to directly recognize whether there is a movement within the redefined subzone or not (e.g. without specifically knowing the borders of the redefined subzone).

By the dragging, the shape of the 3D subzone is distorted, which is different to simply expanding or shrinking the 3D subzone. A distortion leads to a change of an incident angle between two adjacent surfaces of the 3D body defining the 3D subzone. Of course, the method may include a further step to quickly expand or shrink the 3D subzone without distorting the shape. In addition, other typically known measures to view and/or arrange the 3D subzone within the 3D environment model could be implemented, e.g. provision of lateral (xyz) movement and an adaptive scaling of the 3D visualization of the 3D environment model, e.g. with one sweep or a tap coding (e.g. similar to smartphone).

By way of example, the graphical user interface provides for setting different views of the 3D visualization of the 3D environment model, wherein the dragging of the one of the corner points can be carried out in each of the different views.

For example, by allowing/forcing distorting of the shape of the 3D subzone by the dragging of the one of the corner points, an intuitive user operation to (re)define the 3D subzone is provided. A user may select an optimal view of the 3D visualization to move and place a particular corner point, wherein only restricted and well-defined movement (or none at all, see below) of other (not directly affected) corner points or borders of the 3D subzone is carried out, which, for example, prevents false surveillance zone definition.

By way of example, if no distortion is allowed, e.g. the dragging causes an expanding or shrinking the 3D subzone as a whole, the new placement of the dragged corner point may be optimized. However, at the same time the changed outline of the redefined subzone could intrude other zones of the 3D environment model or leave holes in the security net because of the overall shrinking of the outline. Thus, an elaborate iterative step of resizing the 3D subzone accompanied with rotation and linear relocation of the 3D subzone would be required. Still, optimized fitting of each of the borders of the redefined subzone into the 3D environment model could still be impossible.

In one embodiment, the 3D subzone is spanned by a top and base surface and their connection with one another, wherein each of the top and the base surface comprises at least three corners. All edges of the shape of the 3D subzone (edges of the 3D body), which are generated by a connection of corner points of the top surface with corner points of the base surface are parallel to each other. For example, other than the top and the base surface, the lateral surfaces delimiting the 3D subzone are all arranged vertical with respect to a defined horizontal/vertical orientation within the 3D environment model. The dragging of the one of the corner points causes a movement of a connected corner point (of the corner points of the 3D subzone) such that an edge of the 3D subzone defined by a connection of the one of the corner points with the connected corner point remains parallel to the other edges of the shape of the 3D subzone generated by a connection of corner points of the top surface with corner points of the base surface.

In a further embodiment, each of the top and the base surface is a plane polygonal surface with at least three corners, e.g. wherein the top and the base surface are arbitrarily tilted with respect to each other.

By way of example, in a further embodiment, the change functionality is configured such that by dragging a corner point of either the top or the base surface, the complete top or base surface is tilted such that it comprises the new position of the one of the corner points. Alternatively, or in addition, a tilt of the top or the base surface is set by an input functionality via the graphical user interface, e.g. via a menu to define the tilt angle, upon which the tilt angle of the top or the base surface is kept fixed.

In a further embodiment, positions of all the corner points of the 3D subzone within the 3D environment model except for the (dragged) one of the corner points are unaffected by the dragging of the one of the corner points.

By way of example, the change functionality provides for a selection of different dragging modes, wherein in a so-called parallelizing mode an edge of the 3D subzone defined by a connection of the one of the corner points with the connected corner point remains parallel to the other edges of the shape of the 3D subzone as described above; and, in a so-called free mode positions of all the corner points of the 3D subzone within the 3D environment model except for the (dragged) one of the corner points are unaffected by the dragging of the one of the corner points.

In a further embodiment, the change functionality provides for deleting and adding of corner points of the 3D subzone, e.g. wherein the adding comprises clicking on an edge of the 3D subzone at an arbitrary position on the edge (e.g. wherein the clicking is immediately followed by a dragging of the "new" point on the edge) and/or wherein the adding comprises clicking on a surface of the 3D subzone at an arbitrary position on the surface (e.g. wherein the clicking is immediately followed by a dragging of the "new" point on the surface). For example, the change functionality is configured such that a clicking and dragging of the surface introduces a kink in the surface or allows to warp the surface in a defined way.

By way of example, the adding and deleting is configured to generate or delete parallel (e.g. vertical) edges of the 3D subzone as they are described above. Thus, each adding of an additional corner point on the top surface introduces a corresponding added corner point on the base surface (and vice versa), such that an edge defined by a connection of the two added corner points is parallel to the other edges of the shape of the 3D subzone, which were generated by a connection of corner points of the top surface with corner points of the base surface.

In other words, an improved flexible surveillance zone definition functionality for the above described new class of 3D surveillance devices is provided. Referring to the example mentioned at the beginning regarding the complex to be surveilled comprising or bordering a green area, the borders to the green area and thus the definition of the surveillance zone can be frequently updated to provide an optimal compromise between minimization of false alarms and tight shielding, e.g. as a function of the growth state of vegetation or as a function of weather and wind conditions.

The method provides intuitive control of the 3D surveillance device and intuitive definition and redefinition of a 3D subzone, such that a user can quickly adapt the surveillance conditions to a changing environment or a changing situation, e.g. in case of a raised alert situation.

For example, in case the 3D measurement model is generated by using the 3D measurement data of the 3D surveillance device, e.g. wherein an update of the 3D measurement is repeatedly generated in defined intervals and/or upon detection of a defined event within the 3D environment model based on the 3D measurement data used to monitor the spatial volume of the environment, the definition and redefinition of 3D subzones can be carried out with knowledge of real time conditions of the environment.

In a further embodiment, the method comprises storing of a movement history of movements within the 3D environment model, and a step of analyzing the redefined subzone upon execution of the change functionality to provide feedback on the movement history within the redefined subzone via the graphical user interface. For example, this allows the user to manually find a proper distancing of the redefined subzone to a surface of the 3D environment model, which could cause (unalarming) movement detection, e.g. a green area.

In a further embodiment, the redefined subzone is analyzed in real time with the providing of the spatial parameters to the 3D surveillance device for movement detection within the redefined subzone, and real time feedback on the movement detection is provided via the graphical user interface.

For example, this allows fine tuning a border of the redefined 3D subzone close to a potentially moving object of the environment. Again referring to the example mentioned at the beginning when a complex to be surveilled comprises or is bordering a green area, a user may finely adjust an edge of the 3D subzone towards the green area (e.g. having plants moving by wind) by dragging the one of the corner points and receive real time feedback on detected movements within the adjusted subzone. This way, the user may iteratively find an optimal compromise between a small transition zone that tightly delimits the area from the outside and number of false alarms, which is valid for the current environment condition. For example, the spatial parameters associated with the redefined subzone are provided in real time to the 3D surveillance device with each dragging of one of the corner points of the 3D subzone, such that with each dragging the user receives immediate feedback on the movement situation within the redefined subzone.

In a further embodiment, the input functionality provides for a definition of the 3D subzone by selectable options out of a list of auto shapes for the 3D subzone or by arbitrarily defining the corner points of the 3D subzone, e.g. by means of a drawing functionality for arbitrarily drawing the 3D subzone.

In a further embodiment, the method comprises a step of analyzing the 3D measurement data and, based thereof, a step of providing via the graphical user interface an indication of a section within the 3D environment model with a movement history associated to a defined movement category out of a plurality of movement categories For example, different movement categories indicate different threat levels of events, e.g. wherein an event frequency above a defined tolerance frequency triggers a defined alert level. Movements associated to generally non-moving environment objects, e.g. movements of plants caused by wind, birds flying through the environment, typically occur irregularly. In contrast, an intruder who walks through the environment causes constant movement alerts. Even in case an intruder tries to move irregularly, statistical methods can be used to analyze a movement history of a section of the environment to differentiate between an unsuspicious and a suspicious movement history.

The user may then be specifically pointed to problem sections within the environment, which need attention, e.g. by redefining a surveillance zone for these problem sections. By way of example, the input functionality comprises automatic provision of a (proposed) 3D subzone around the section within the 3D environment model associated to the defined movement category.

Based on the movement history, e.g. by means of a statistical analysis of the movement history, a sensitivity level for raising an alarm may be increased or decreased. For example, this may be beneficial for optimizing processing load on the 3D surveillance device. Accordingly, in a further embodiment, the defined movement category is associated to an assessment rule for categorizing the 3D measurement data to generate the action in case the movement within the redefined subzone is detected. The graphical user interface then provides a feedback functionality for a user to confirm or change the assessment rule, and the confirmed or changed assessment rule is provided to the 3D surveillance device, which is caused to generate the action based thereof.

In a further embodiment, the method comprises a step of providing via the graphical user interface a snapping-in step, wherein during the dragging of the one of the corner points a relative geometric arrangement of the one of the corner points and/or an associated surface of the 3D subzone comprising the one of the corner points on the one hand, and an area, e.g. a surface, of the 3D environment model on the other hand is analyzed. Based on this relative geometric arrangement, a defined snapping-in arrangement of the one of the corner points or the associated surface is suggested so that the one of the corner points or the associated surface clings to the area of the 3D environment model in a defined way. For example, if a sidewall of the 3D subzone is to be dragged close to a wall of the environment, this is automatically recognized such that the sidewall of the 3D subzone is automatically arranged (and snapped-in) parallel to the wall of the environment.

In a further embodiment, the snapping-in step comprises an automatic distancing of the snapping-in arrangement with respect to the area of the 3D environment model. For example, a user-defined minimal distance between the snapping-in arrangement with respect to the area of the 3D environment model is provided by user input via the graphical user interface. For example, for defining the minimal distance a user may use feedback on a movement history within the redefined subzone as described above, e.g. derived from a stored movement history of movements within the 3D environment model (see above).

Alternatively, or in addition, the automatic distancing comprises a statistical categorization of movements associated with the area of the 3D environment model and, based thereof, provision of an automatically derived minimal distance between the snapping-in arrangement with respect to the area of the 3D environment model.

By way of example, the minimal distance is different for areas with different movement expectations. There may be a larger minimal distance between a border of the 3D subzone towards a green area with vegetation with frequent plant movement than between a border of the 3D subzone towards a rigid (e.g. concrete) wall of the environment.

The disclosure further relates to a system, which comprises a 3D surveillance device and a computing unit, wherein the computing unit is configured to provide data communication with the 3D surveillance device and an electronic graphical display, e.g. wherein the 3D surveillance device comprises the computing unit.

The system is configured to carry out the method according to one of the embodiments described above, wherefore the 3D surveillance device comprises a 3D coordinate measurement unit configured to capture a spatial volume of the environment by 3D coordinate measurement data based on a time-of-flight principle. The system, e.g. the 3D surveillance device, comprises an object detector (an object detection algorithm) configured for detecting an object within a defined subarea of a monitored spatial volume of the environment based on 3D coordinate measurement data of the 3D surveillance device. For example, for the detection of an object a 3D change detection algorithm is used.

The computing unit is configured to:
- read input data associated to the 3D surveillance device, wherein the input data provide coordinate information associated to a position of the 3D surveillance device within the 3D environment model;
- provide a generation of a graphical user interface on the electronic graphical display, wherein the graphical user interface provides a 3D visualization of the 3D environment model and the 3D visualization comprises an indication of the position of the 3D surveillance device;
- provide via the graphical user interface an input functionality for a user to define a 3D subzone within the 3D environment model, wherein the 3D subzone has a shape of a 3D body, which is spanned by a connection of at least four corner points;
- provide via the graphical user interface a change functionality for a user to generate a redefined subzone by dragging one of the corner points of the 3D subzone to a different position within the 3D visualization of the 3D environment model, whereby the shape of the 3D subzone is distorted; and
- provide spatial parameters associated with the redefined subzone within the 3D environment model and cause the 3D surveillance device to generate an action, particularly an alarm, in case a movement within the redefined subzone is detected by means of the 3D measurement data.

In one embodiment, the 3D coordinate measurement unit is embodied as a lidar unit configured to provide the 3D coordinate measurement data by carrying out a distance measurement by emitting a laser beam and detecting returning parts of the laser beam. The lidar unit comprises a base, a support, and a rotating body, wherein the support is mounted on the base such that it is rotatable about a first axis and the rotating body is arranged and configured to rotate about a second axis, which is perpendicular to the first axis, and to provide for a variable deflection of an outgoing and a returning part of the laser beam, thereby providing a rotation of the laser beam about the second axis.

By way of example, the rotating body is rotated about the second axis with at least 50 Hz and the laser beam is rotated about the first axis with at least 0.5 Hz, wherein the laser beam is emitted as pulsed laser beam, e.g. wherein the pulsed laser beam comprises 1.2 million pulses per second. In particular, the 3D coordinate measurement unit is configured to have a field-of-view of 360 degrees about the first axis and 130 degrees about the second axis, and to generate 3D coordinate measurement data with a point acquisition rate of at least 150'000 points per second.

In a further embodiment, the 3D surveillance device is configured to provide at least one of selective storage, selective processing, and selective generation of the 3D coordinate measurement data as a function of the defined subarea, e.g. as a function of the redefined subzone. By way of example, the 3D surveillance device is configured to prioritize generation and/or processing of 3D coordinate measuring data which cover the defined subarea. Alternatively, or in addition, the 3D surveillance device is provided with information of a defined movement category for the defined subarea or an associated assessment rule for categorizing the 3D measurement data (e.g. see above), which causes the 3D surveillance device to treat and analyze the 3D measurement data of the defined subarea in a specific way, e.g. to derive an action such as an alarm associated with movement within the defined subarea.

The disclosure further relates to a computer program product comprising program code, which, when executed by a computing unit of a system according to one of the embodiments described above, causes the system to carry out the method according to one of the embodiments described above.

BRIEF DESCRIPTION OF THE DRAWINGS

The method, system, and computer program product according to the different aspects of the disclosure are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
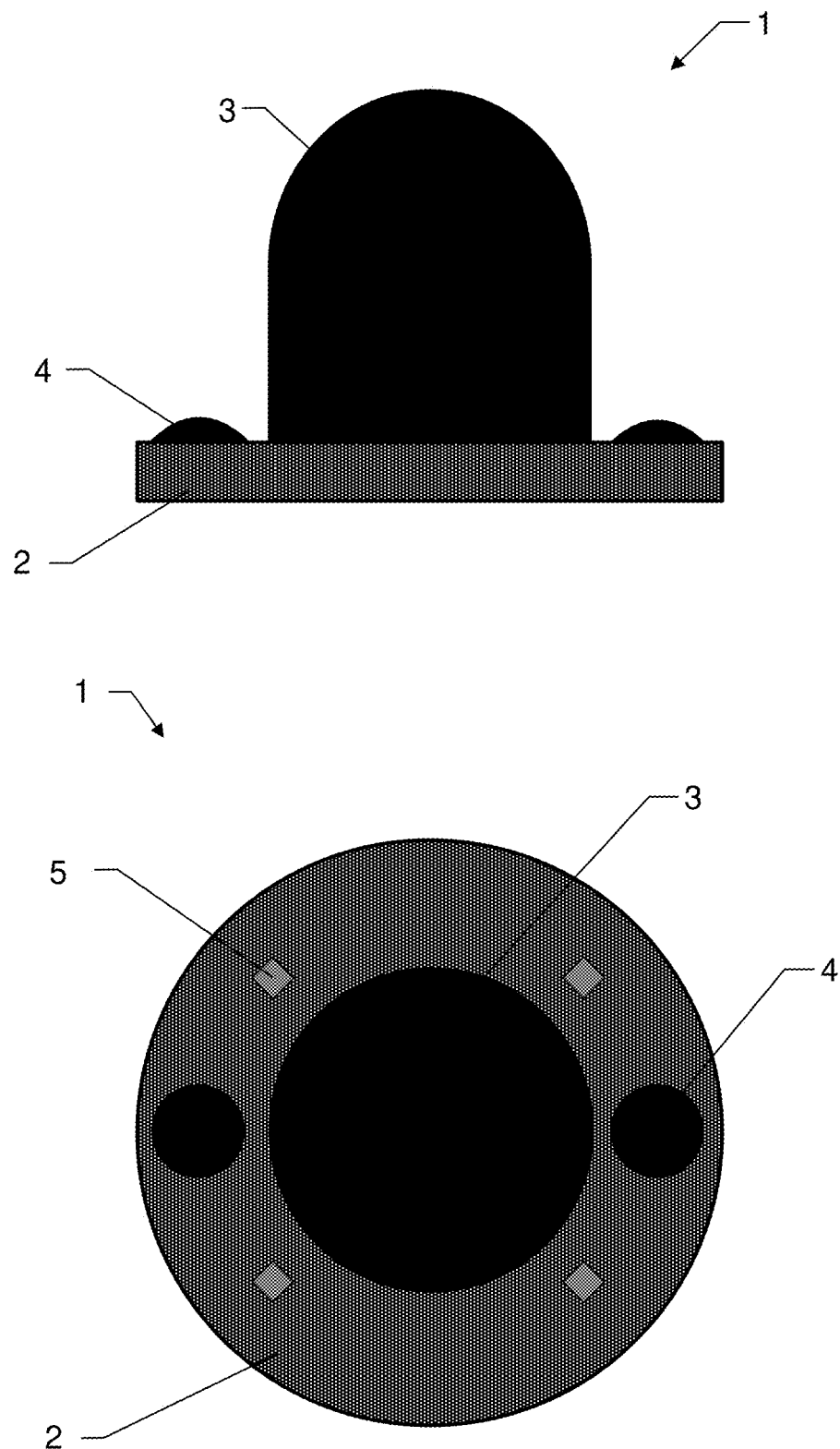
FIG. 1: an exemplary embodiment of a 3D surveillance device usable in a surveillance system.

FIG. 1 shows an exemplary embodiment of a 3D surveillance device 1 usable in a surveillance system. The top part of the figure shows a side view of the 3D surveillance device 1 and the bottom part of the figure shows a top view of the 3D surveillance device 1.

Figure 2:
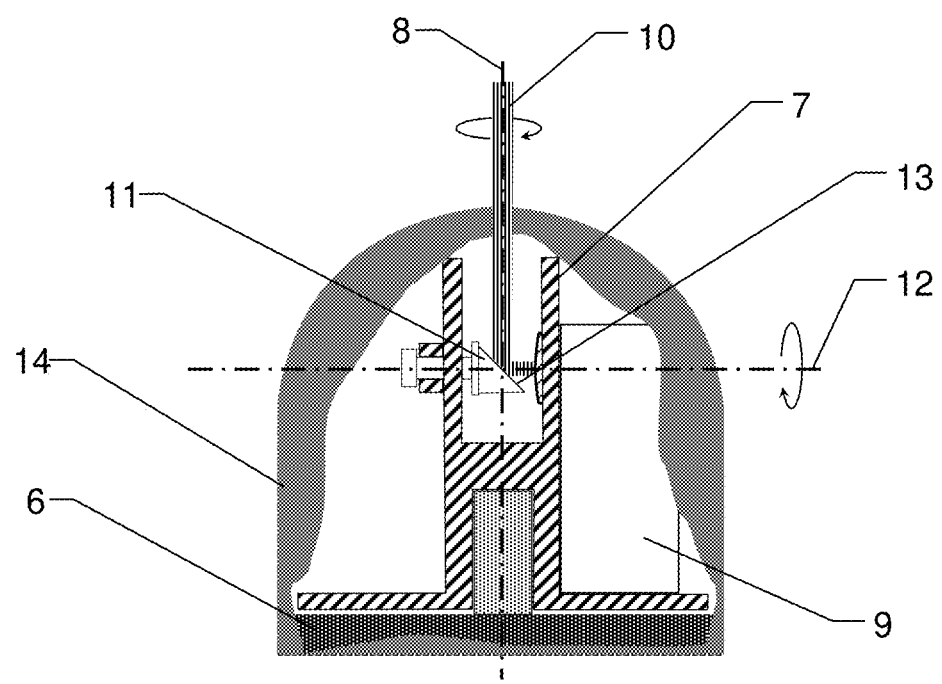
FIG. 2: an exemplary embodiment of the 3D coordinate measurement unit of FIG. 1 in the form of a so-called two-axis laser scanner.

The 3D surveillance device 1 comprises a common sensor platform 2 supporting a time-of-flight based 3D coordinate measurement unit 3, e.g. as described with respect to FIG. 2, and, for example, an additional multispectral imaging unit comprising multispectral cameras 4 arranged on a circumferential area around a cover of the 3D coordinate measurement unit 3.

In the shown example, the multispectral imaging unit comprises two visual imaging cameras 4, each visual camera 4 having a field of view of at least 180 degrees, and four thermal imaging cameras 5, each of the four thermal imaging cameras 5 having a field of view of at least 80 degrees.

By way of example, the 3D surveillance device 1 thus provides for movement detection based on recognizing a change in a 3D point cloud generated by the 3D measurement unit 1 by determining a deviation of the 3D point cloud from a frequently updated 3D background model and based on visual and temperature information. In particular, based on data from the 3D surveillance device 1, the inventive system is able to frequently update the background model in order to take into account essentially static changes in the environment, e.g. a slowly growing green area, when defining different surveillance zones.

FIG. 2 shows an exemplary embodiment of the 3D coordinate measurement unit 3 of FIG. 1 in the form of a so-called two-axis laser scanner. The laser scanner comprises a base 6 and a support 7, the support 7 being rotatably mounted on the base 6 about the vertical axis 8. Often the rotation of the support 7 about the vertical axis 8 is also called azimuthal rotation, regardless of whether the laser scanner, or the vertical axis 8, is aligned exactly vertically.

The core of the laser scanner is an optical distance measurement unit 9 configured to perform a distance measurement by emitting a pulsed laser beam 10, e.g. wherein the pulsed laser beam comprises 1.2 million pulses per second, and by detecting returning parts of the pulsed laser beam by means of a receiving unit comprising a photosensitive sensor. Thus, a pulse echo is received from a backscattering surface point of the environment, wherein a distance to the surface point can be derived based on analyzing emission and return time, the shape, and/or the phase of the emitted pulse.

The scanning movement of the laser beam 10 is carried out by rotating the support 7 relative to the base 6 about the vertical axis 8 and by means of a rotating body 11, which is rotatably mounted on the support 7 and rotates about the horizontal axis 12. By way of example, both the transmitted laser beam 10 and the returning parts of the laser beam are deflected by means of a reflecting surface 13 of the rotating body 11. Alternatively, the transmitted laser radiation is coming from the side facing away from the reflecting surface 13, i.e. coming from the inside of the rotating body 11, and emitted into the environment via a passage area within the reflecting surface.

For the determination of the emission direction of the distance measurement beam 10 many different angle determining units are known in the prior art. For example, the emission direction may be detected by means of angle encoders, which are configured for the acquisition of angular data for the detection of absolute angular positions and/or relative angular changes of the support 7 or of the rotating body 11, respectively. Another possibility is to determine the angular positions of the support 7 or the rotating body 11, respectively, by only detecting full revolutions and using knowledge of the set rotation frequency.

A visualization of the data of the 3D coordinate measurement unit can be based on commonly known data processing steps and/or display options, e.g. wherein the acquired data is presented in the form of a 3D point cloud or wherein 3D vector file model is generated.

The laser scanner is configured to ensure a total field of view of the measuring operation of the laser scanner of 360 degrees in an azimuth direction defined by the rotation of the support 7 about the vertical axis 8 and at least 130 degrees in a declination direction defined by the rotation of the rotating body 11 about the horizontal axis 12. In other words, regardless of the azimuth angle of the support 7 about the vertical axis 8, the laser beam 10 can cover a vertical field of view spread in the declination direction with a spread angle of at least 130 degrees.

By way of example, the total field of view typically refers to a central reference point of the laser scanner defined by the intersection of the vertical axis 8 with the horizontal axis 12. Here, the laser scanner is concealed behind a cover 14, which is opaque for the visual wavelength range, but transparent for the (typically infrared) wavelength of the laser beam 10.

Figure 3:
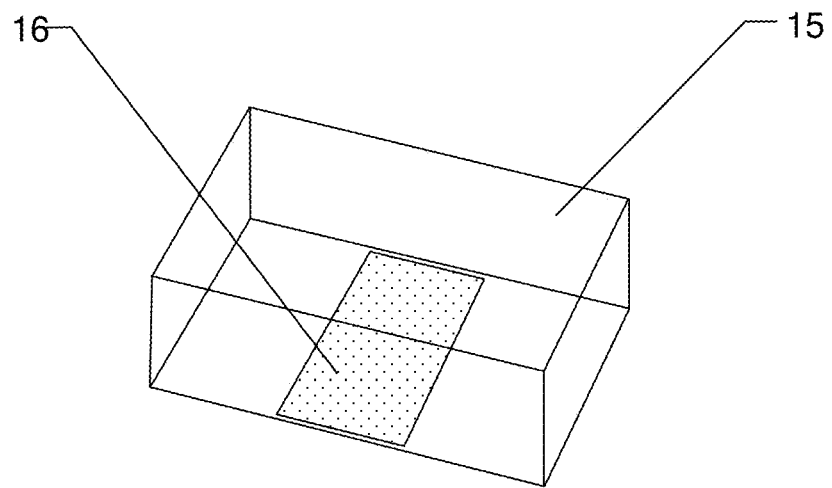
FIG. 3: schematically depicts the problem of using a 3D surveillance device in an, e.g. quasi-statically, changing environment.
Figure 3:
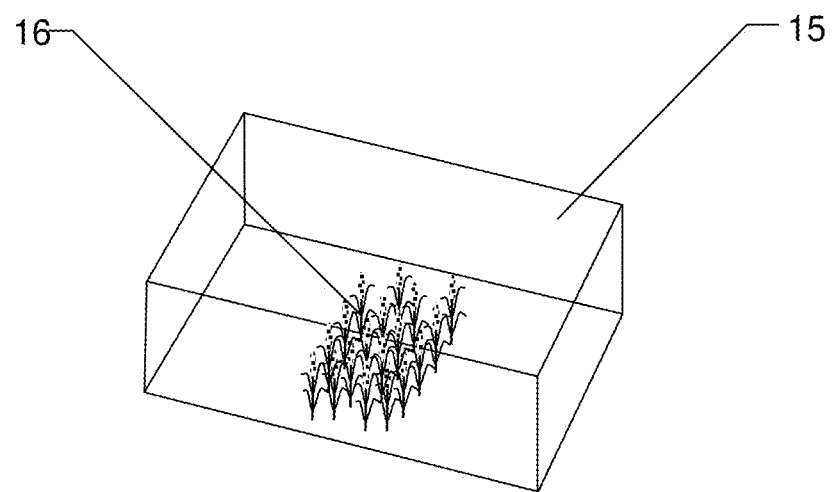

FIG. 3 schematically depicts the problem of using a 3D surveillance device 1 (FIG. 1) in an, e.g. quasi-statically, changing environment. For example, a 3D surveillance zone 15 of the environment is defined to be surveilled by the 3D surveillance device, which is caused to raise an alarm in case of a movement detection within the 3D surveillance zone 15.

Often, a surveillance zone ranges close to the ground, e.g. to prevent somebody crouching "underneath" the surveillance zone. In the example shown, the surveillance zone 15 comprises a green area 16, e.g. an area with ornamental plants.

In the state depicted at the top of the figure, the plants of the green area 16 are cut relatively short. Thus, for example, the surveillance zone 15 starts above the green area 16. Anyway, given the short cut, not much plant movement (e.g. due to wind) is expected.

In the state depicted at the bottom of the figure, the plants of the green area 16 have grown and now protrude into the surveillance zone 15. In such a state, the plants could frequently raise false movement alarms by the 3D surveillance device. For example, the surveillance zone 15 is located in an inner courtyard of a building complex and the tall plants could now move substantially, e.g. caused by wind, wherein the 3D surveillance device detects the plant movement.

Figure 4:
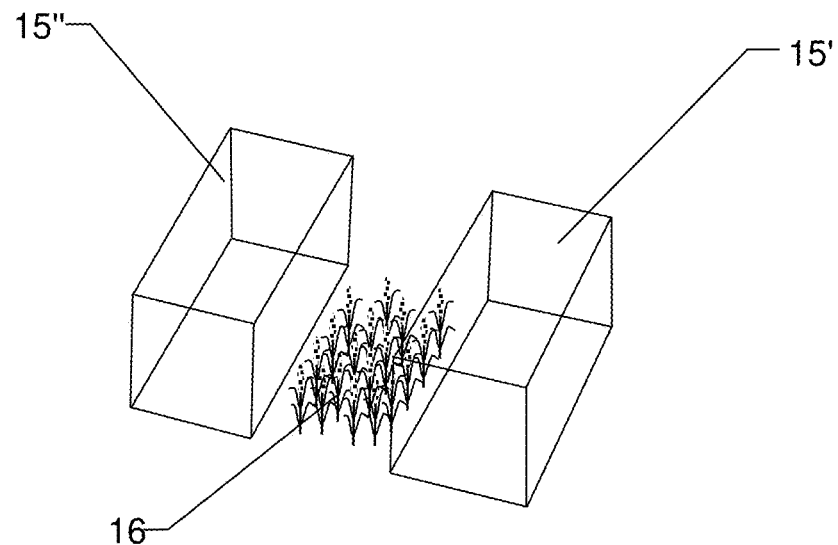
FIG. 4: schematically depicts one solution to the problem depicted by FIG. 3.

FIG. 4 depicts one solution to this problem, wherein multiple different surveillance zones 15', 15" around (and thereby excluding) the vegetation area 16 are defined. However, full exclusion of the vegetation area 16 may prevent false alarms but at the same time introduce a hole into the security net.

Figure 5:
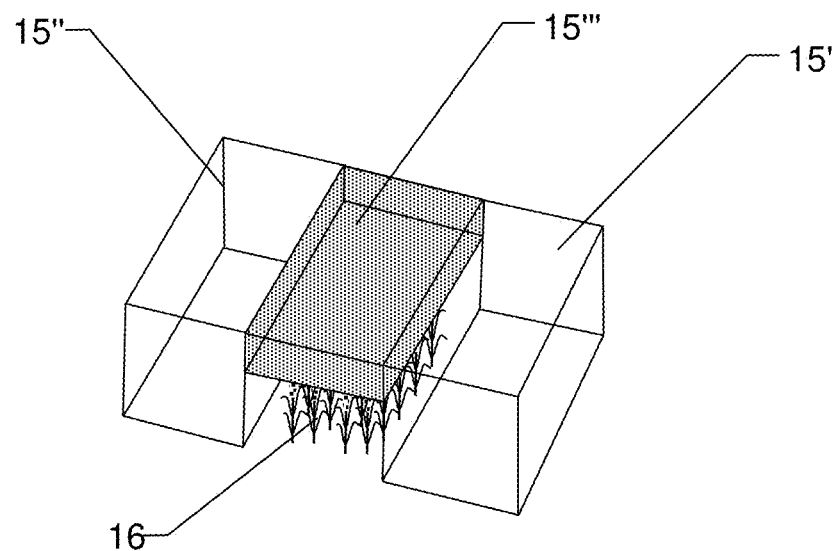
FIG. 5: schematically depicts a further solution to the problem depicted by FIG. 3.

Ideally, as depicted by FIG. 5, newly defined surveillance zones 15', 15", 15''' (or a newly defined single surveillance zone with changed, e.g. more complex, shape) are defined in order to take into account the changed state of the green area 16. The newly defined zones (or the newly defined single zone) tightly adjoin(s) the green area 16, such that an optimal compromise between false alarms and small tolerance areas between all sides of the (not surveilled) green area 16 and the surveillance zones 15', 15", 15''' is achieved.

For the sake of simplicity, only a vertical optimization is shown in FIG. 5, which, for example, is provided by two laterally adjacent surveillance zones 15', 15" and a surveillance zone 15''' starting closely above the growing height of the plants of the green area 16. It goes without saying that similar optimization could be implemented to further reduce lateral tolerances or for optimal shielding from the front and the back of the green area 16 (not shown).

Figure 6:
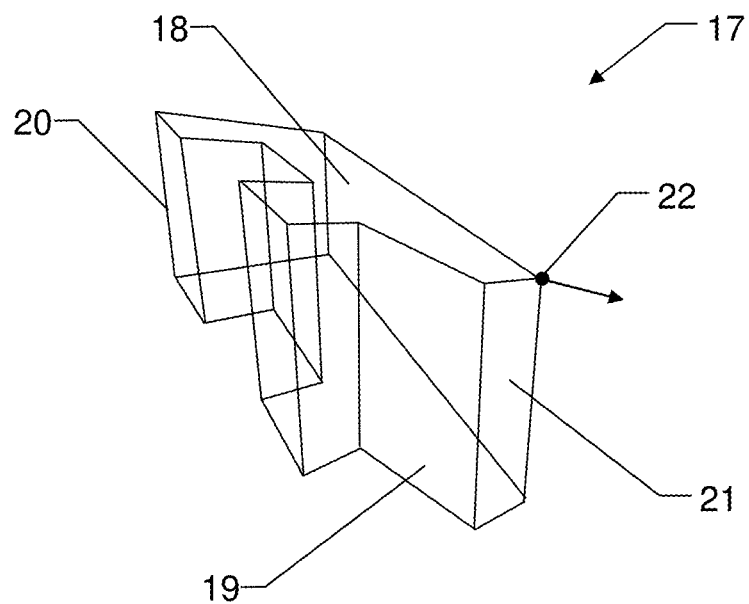
FIG. 6: schematically depicts an embodiment of the change functionality, wherein the dragging of one of the corner points causes movements of connected corner points such that the lateral surfaces and previously parallel edges remain parallel to the other edges and the other lateral surfaces, respectively.
Figure 6:
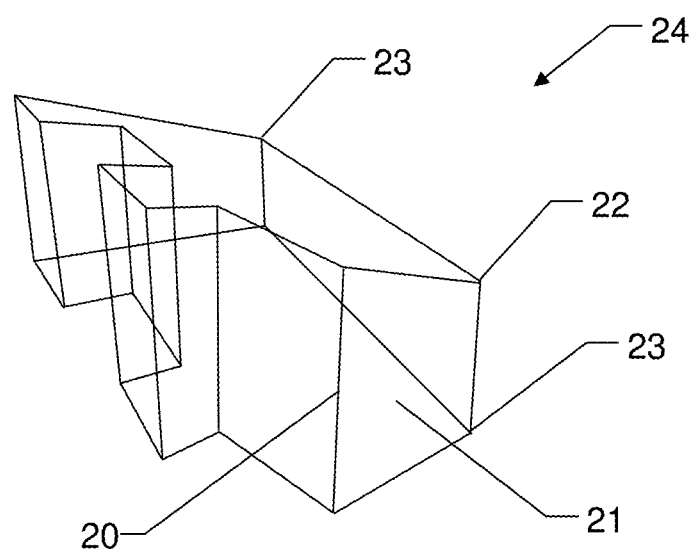

FIG. 6 schematically depicts one embodiment, wherein the 3D subzone 17 is spanned by a plane polygonal top surface 18 and a plane polygonal base surface 19 and their connection with one another. Edges 20 of the shape of the 3D subzone 17, which are generated by a connection of corner points of the top surface 18 with corner points of the base surface 19 are parallel to each other. For example, the lateral surfaces 21 delimiting the 3D subzone 17 are all arranged vertical with respect to a defined horizontal/vertical orientation within the 3D environment model.

The top of the figure depicts a state of the 3D subzone 17 before the dragging of the one of the corner points 22 and the bottom of the figure depicts the state of the redefined subzone 24 after the dragging of the one of the corner points 22.

In this embodiment, the dragging of one of the corner points 22, here a corner point of the top surface 18 causes movements of connected corner points 23 (and possibly further corner points) such that the lateral surfaces 21 and the previously parallel edges 20 remain parallel to the other edges 20 and the other lateral surfaces 21, respectively.

Figure 7:
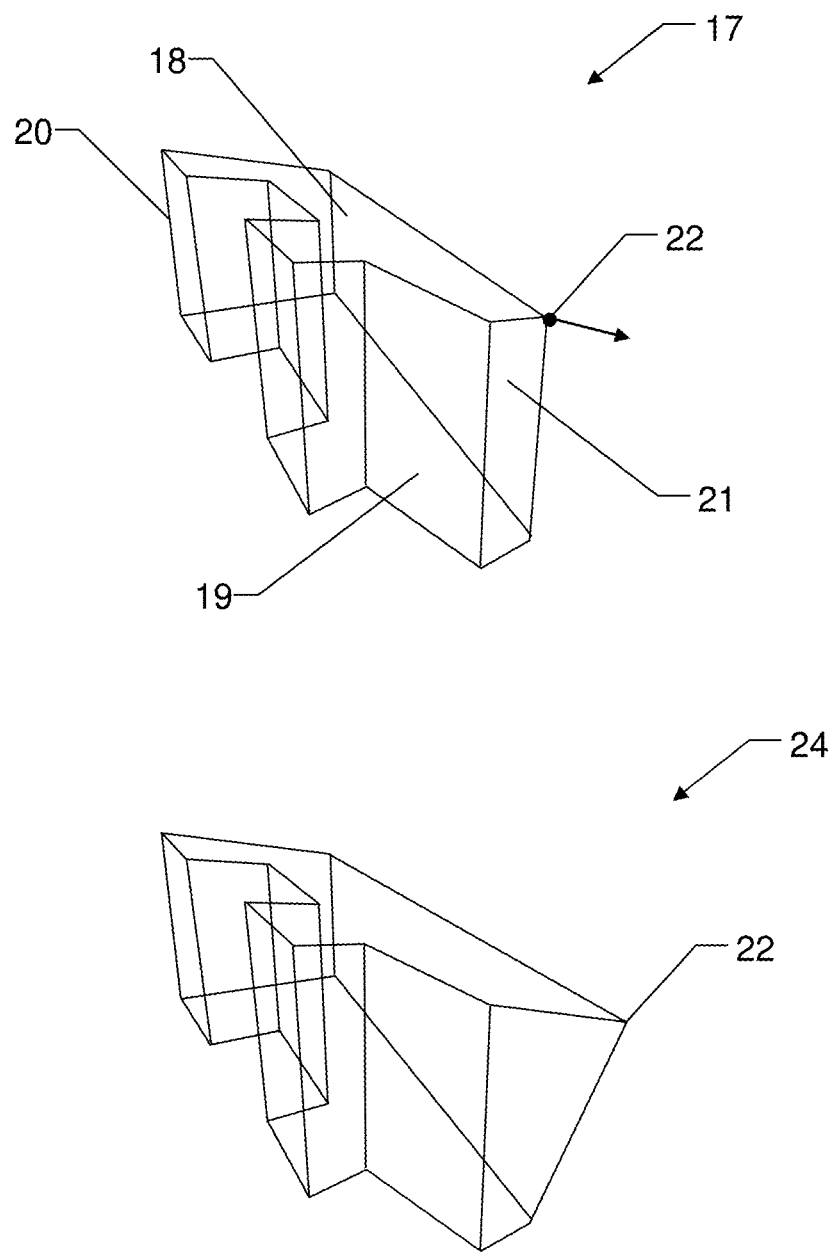
FIG. 7: schematically depicts a further embodiment of the change functionality, wherein positions of all the corner points except for the dragged corner point are unaffected by the dragging.

FIG. 7 schematically depicts a further embodiment, wherein the 3D subzone 17 is initially defined in a similar manner as described above for the embodiment of FIG. 6. However, here positions of all the corner points of the 3D subzone 17 except for the dragged corner point 22 are unaffected by the dragging of the dragged corner point 22.

Again, the top of the figure depicts a state of the 3D subzone 17 before the dragging of the one of the corner points 22 and the bottom of the figure depicts the state of the redefined subzone 24 after the dragging of the one of the corner points 22.

Figure 8:
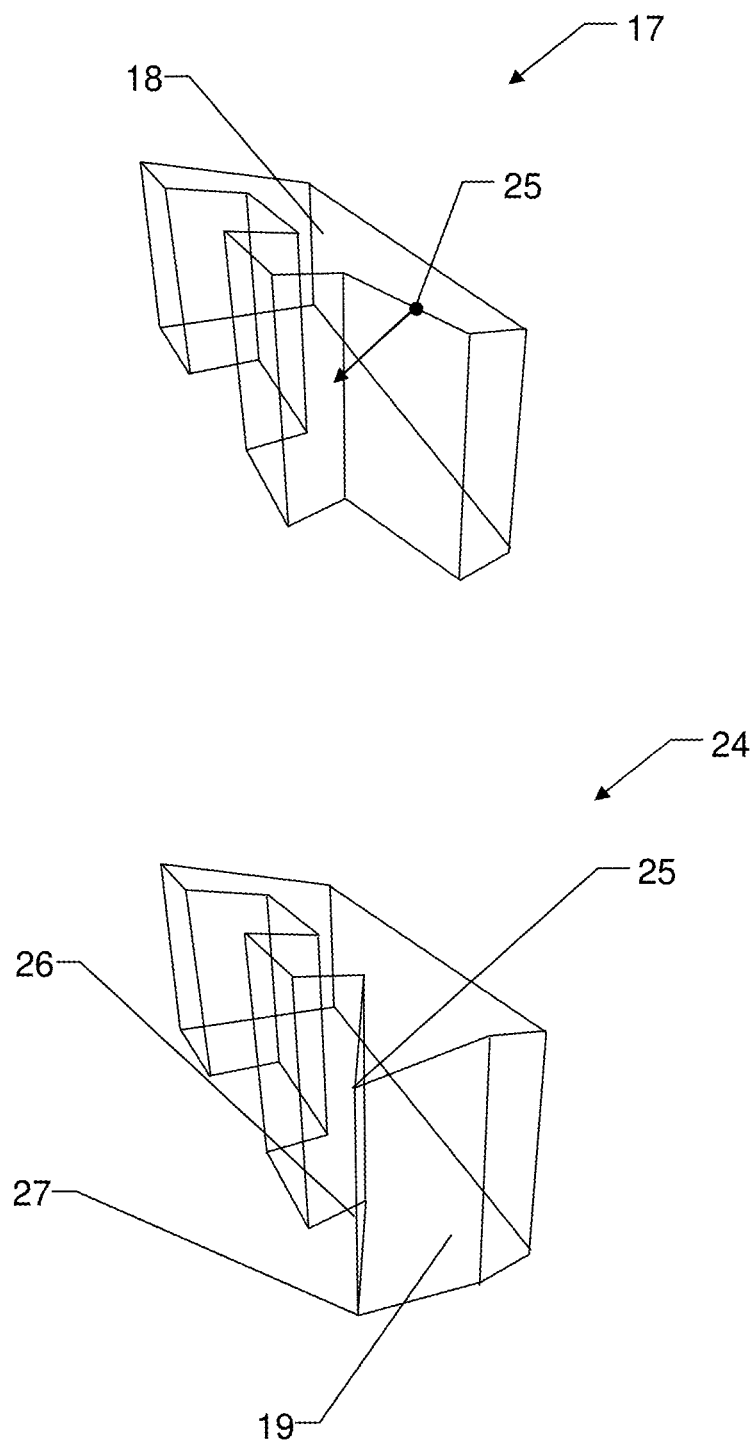
FIG. 8: schematically depicts an adding of a new corner point within the change functionality.

FIG. 8 schematically depicts an adding of a new corner point 25 to the 3D subzone 17, wherein the top of the figure depicts a state of the 3D subzone 17 before the adding (and dragging) of the new corner point 25 and the bottom of the figure depicts the state of the redefined subzone 24 after the adding (and dragging) of the new corner point 25.

By way of example, the adding comprises clicking at an arbitrary position on one of the edges, here an edge of the top surface 18. The clicking adds a corner point 25, which can be dragged to a new position.

In the embodiment shown, the adding and dragging of the new corner point 25 causes generation of a new vertical edge 26 of the redefined 3D subzone 24, i.e. automatic generation of a corresponding added corner point 27 on the base surface 19, such that the new edge 26 is parallel to the other edges generated by a connection of corner points of the top surface with corner points of the base surface.

Figure 9:
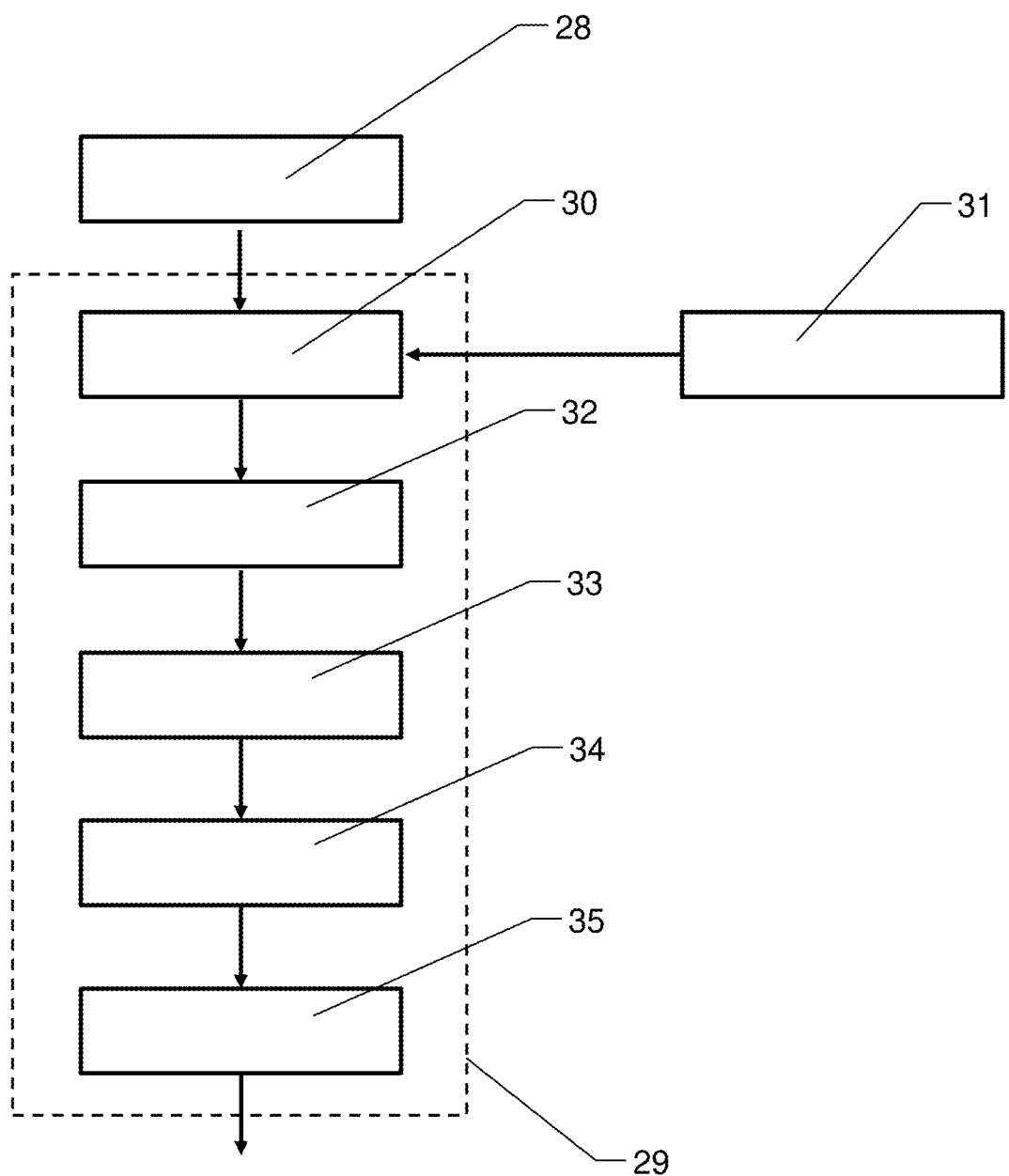
FIG. 9: schematically depicts different steps of an embodiment of the inventive method.

FIG. 9 schematically depicts an embodiment of the inventive method for controlling a 3D surveillance device as described with respect to FIG. 1.

The 3D surveillance device generates 3D measurement data 28 of the environment, wherein the 3D surveillance device is configured to provide the 3D measurement data 28 to an external computing unit 29 having stored a program code to carry out the method as described above. In a first step, the computing unit 29 is caused to read 30 input data 31 associated to the 3D surveillance device, wherein the input data 31 provide information of a 3D environment model and coordinate information associated to a position of the 3D surveillance device within the 3D environment model.

In a next step, the input data 31 is used to cause generation of a graphical user interface, on an electronic graphical display, which provides a 3D visualization 32 of the 3D environment model, wherein the visualization 32 comprises an indication of the position of the 3D surveillance device within the 3D environment model.

In a further step, the graphical user interface is caused to provide an input functionality 33, wherein a user can define a 3D subzone within the 3D environment model. The 3D subzone has a shape of a 3D body, which is spanned by a connection of at least four corner points.

After definition of the 3D subzone within the 3D environment model, the program causes provision of a change functionality 34 to the user where he can generate a redefined 3D subzone by dragging one of the corner points of the 3D subzone to a different position within the 3D visualization of the 3D environment model. Thereby the shape of the 3D subzone is distorted, wherein only restricted and well-defined movement (or none at all, see above) of other corner points or borders of the 3D subzone is allowed.

Based on the redefined 3D subzone, the computing unit 29 calculates spatial parameters 35, which provide geometric information of the geometry of the redefined subzone and positional information of the redefined subzone within the 3D environment model. The spatial parameters 35 are then provided to the 3D surveillance device, which is caused to generate an action, e.g. an alarm, in case it detects a movement and/or a spatial change within the redefined subzone.

Figure 10:
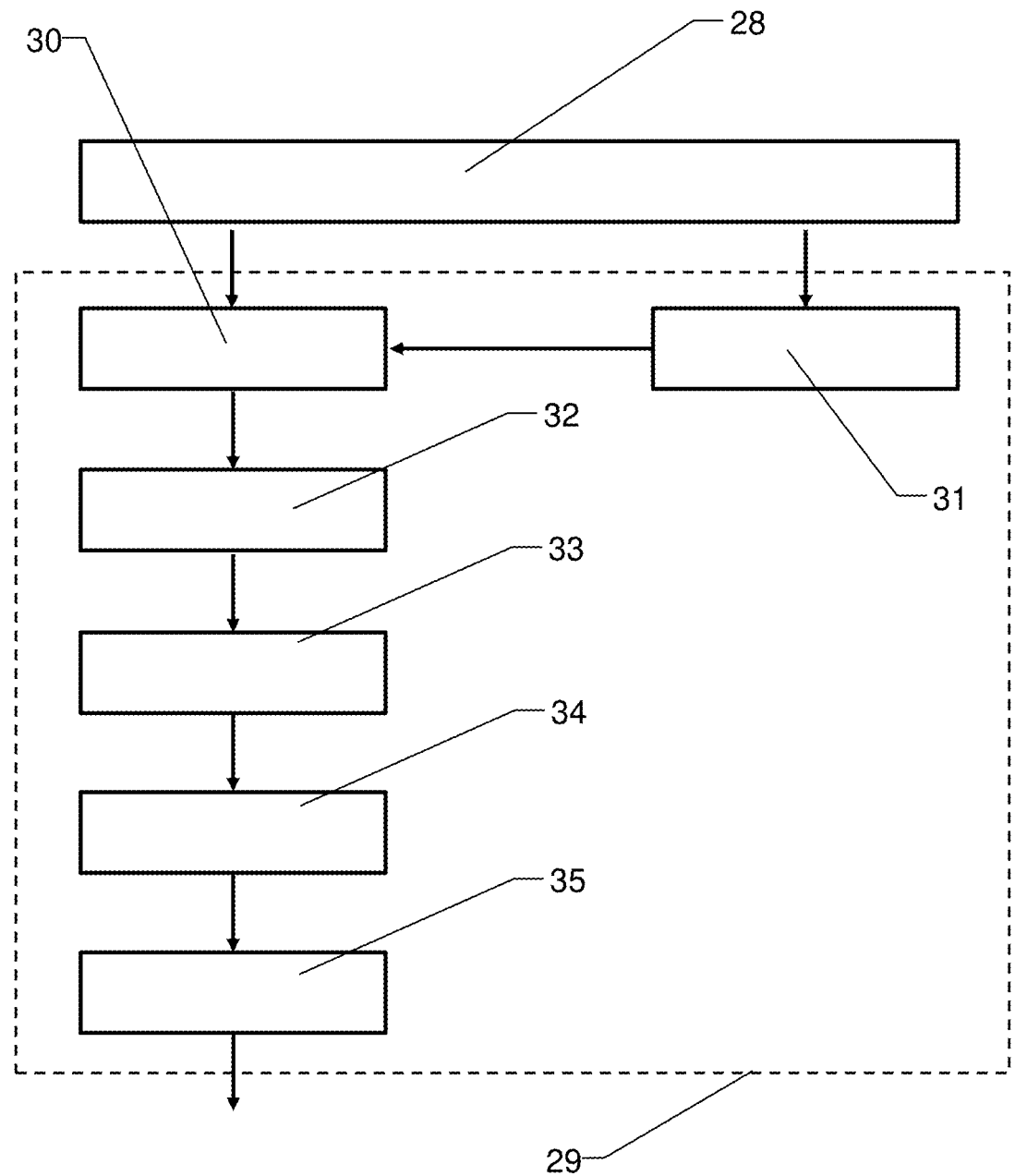
FIG. 10: schematically depicts different steps of a further embodiment of the inventive method, wherein the 3D environment model is generated from the 3D measurement data of the 3D surveillance device.

FIG. 10 schematically depicts a further embodiment of the inventive method for controlling a 3D surveillance device as described with respect to FIG. 1.

Here, the method differs from the embodiment described for the embodiment depicted by FIG. 9, in that the computing unit 29 is configured to use 3D measurement data 28 provided by the 3D surveillance device to generate the 3D measurement model, e.g. wherein the 3D measurement model is repeatedly generated in defined time intervals. Thus, the computing unit 29 generates and regularly updates the input data 31 associated to the 3D surveillance device. For example, the computing unit is caused to use the measurement data 28 to generate a 3D point cloud or a 3D vector file model to be used as the 3D environment model. Since the 3D environment model is generated from the 3D measurement data of the 3D surveillance device, the position of the 3D surveillance device within the 3D environment model is inherently known.

The rest of the steps 30, 32, 33, 34, 35 are similar as described with respect to FIG. 9.

Although the disclosure is illustrated above, partly with reference to some preferred embodiments, it must be understood that numerous modifications and combinations of different features of the embodiments can be made. All of these modifications lie within the scope of the appended claims.

The invention claimed is:

1. A method for controlling a 3D surveillance device configured to generate 3D measurement data of a spatial volume of an environment and to monitor the spatial volume of the environment using the 3D measurement data and a 3D environment model, comprising:
   reading input data associated to the 3D surveillance device, wherein the input data provide coordinate information associated to a position of the 3D surveillance device within the 3D environment model,
   generating on an electronic graphical display a graphical user interface which provides a 3D visualization of the 3D environment model, wherein the 3D visualization comprises an indication of the position of the 3D surveillance device,
   providing via the graphical user interface an input functionality for a user to define a 3D subzone within the 3D environment model, wherein the 3D subzone has a shape of a 3D body, which is spanned by a connection of at least four corner points,
   providing via the graphical user interface a change functionality for a user to generate a redefined subzone by dragging one of the corner points of the 3D subzone to a different position within the 3D visualization of the 3D environment model, whereby the shape of the 3D subzone is distorted, and
   providing to the 3D surveillance device spatial parameters associated with the redefined subzone within the 3D environment model and causing the 3D surveillance device to generate an action, particularly an alarm, in case a movement within the redefined subzone is detected by means of the 3D measurement data,
   the method further comprising a step of using 3D measurement data of the 3D surveillance device to generate the 3D measurement model, particularly wherein the 3D measurement model is repeatedly generated in defined intervals and/or upon detection of a defined event within the 3D environment model based on the 3D measurement data used to monitor the spatial volume of the environment.

2. The method according to claim 1, wherein the 3D subzone is spanned by a top and base surface and their connection with one another, wherein each of the top and the base surface comprises at least three corners, wherein all edges of the shape of the 3D subzone generated by a connection of corner points of the top surface with corner points of the base surface are parallel to each other, wherein the dragging of the one of the corner points causes a movement of a connected corner point such that an edge of the 3D subzone defined by a connection of the one of the corner points with the connected corner point remains parallel to the other edges of the shape of the 3D subzone generated by a connection of corner points of the top surface with corner points of the base surface.

3. The method according to claim 1, wherein positions of all the corner points of the 3D subzone within the 3D environment model except for the one of the corner points are unaffected by the dragging of the one of the corner points.

4. The method according to claim 1, wherein the change functionality provides for deleting and adding of corner points of the 3D subzone, particularly wherein the adding comprises a clicking on an edge of the 3D subzone at an arbitrary position on the edge and/or wherein the adding comprises a clicking on a surface of the 3D subzone at an arbitrary position on the surface.

5. A method for controlling a 3D surveillance device configured to generate 3D measurement data of a spatial volume of an environment and to monitor the spatial volume of the environment using the 3D measurement data and a 3D environment model, comprising:
   reading input data associated to the 3D surveillance device, wherein the input data provide coordinate information associated to a position of the 3D surveillance device within the 3D environment model,
   generating on an electronic graphical display a graphical user interface which provides a 3D visualization of the 3D environment model, wherein the 3D visualization comprises an indication of the position of the 3D surveillance device,
   providing via the graphical user interface an input functionality for a user to define a 3D subzone within the 3D environment model, wherein the 3D subzone has a shape of a 3D body, which is spanned by a connection of at least four corner points,
   providing via the graphical user interface a change functionality for a user to generate a redefined subzone by dragging one of the corner points of the 3D subzone to a different position within the 3D visualization of the 3D environment model, whereby the shape of the 3D subzone is distorted, and
   providing to the 3D surveillance device spatial parameters associated with the redefined subzone within the 3D environment model and causing the 3D surveillance device to generate an action, particularly an alarm, in case a movement within the redefined subzone is detected by means of the 3D measurement data,
   the method further comprising a step of storing a movement history of movements within the 3D environment model, and a step of analyzing the redefined subzone upon execution of the change functionality to provide feedback on the movement history within the redefined subzone via the graphical user interface.

6. A method for controlling a 3D surveillance device configured to generate 3D measurement data of a spatial volume of an environment and to monitor the spatial volume of the environment using the 3D measurement data and a 3D environment model, comprising:
   reading input data associated to the 3D surveillance device, wherein the input data provide coordinate information associated to a position of the 3D surveillance device within the 3D environment model,
   generating on an electronic graphical display a graphical user interface which provides a 3D visualization of the 3D environment model, wherein the 3D visualization comprises an indication of the position of the 3D surveillance device,
   providing via the graphical user interface an input functionality for a user to define a 3D subzone within the 3D environment model, wherein the 3D subzone has a shape of a 3D body, which is spanned by a connection of at least four corner points,
   providing via the graphical user interface a change functionality for a user to generate a redefined subzone by dragging one of the corner points of the 3D subzone to a different position within the 3D visualization of the 3D environment model, whereby the shape of the 3D subzone is distorted, and
   providing to the 3D surveillance device spatial parameters associated with the redefined subzone within the 3D environment model and causing the 3D surveillance device to generate an action, particularly an alarm, in case a movement within the redefined subzone is detected by means of the 3D measurement data, the method further comprising a step of analyzing the redefined subzone in real time with the providing of the spatial parameters to the 3D surveillance device for movement detection within the redefined subzone, and providing real time feedback on the movement detection via the graphical user interface.

7. A method for controlling a 3D surveillance device configured to generate 3D measurement data of a spatial volume of an environment and to monitor the spatial volume of the environment using the 3D measurement data and a 3D environment model, comprising:

reading input data associated to the 3D surveillance device, wherein the input data provide coordinate information associated to a position of the 3D surveillance device within the 3D environment model, generating on an electronic graphical display a graphical user interface which provides a 3D visualization of the 3D environment model, wherein the 3D visualization comprises an indication of the position of the 3D surveillance device, providing via the graphical user interface an input functionality for a user to define a 3D subzone within the 3D environment model, wherein the 3D subzone has a shape of a 3D body, which is spanned by a connection of at least four corner points, providing via the graphical user interface a change functionality for a user to generate a redefined subzone by dragging one of the corner points of the 3D subzone to a different position within the 3D visualization of the 3D environment model, whereby the shape of the 3D subzone is distorted, and providing to the 3D surveillance device spatial parameters associated with the redefined subzone within the 3D environment model and causing the 3D surveillance device to generate an action, particularly an alarm, in case a movement within the redefined subzone is detected by means of the 3D measurement data, the method further comprising a step of analyzing the 3D measurement data and, based thereof, a step of providing via the graphical user interface an indication of a section within the 3D environment model with a movement history associated to a defined movement category out of a plurality of movement categories, wherein the input functionality comprises automatic provision of the 3D subzone around the section within the 3D environment model associated to the defined movement category.

8. The method according to claim 7, wherein:
the defined movement category is associated to an assessment rule for categorizing the 3D measurement data to generate the action in case the movement within the redefined subzone is detected,
the graphical user interface provides a feedback functionality for a user to confirm or change the assessment rule, and
the confirmed or changed assessment rule is provided to the 3D surveillance device, which is caused to generate the action based thereof.

9. A method for controlling a 3D surveillance device configured to generate 3D measurement data of a spatial volume of an environment and to monitor the spatial volume of the environment using the 3D measurement data and a 3D environment model, comprising:

reading input data associated to the 3D surveillance device, wherein the input data provide coordinate information associated to a position of the 3D surveillance device within the 3D environment model, generating on an electronic graphical display a graphical user interface which provides a 3D visualization of the 3D environment model, wherein the 3D visualization comprises an indication of the position of the 3D surveillance device, providing via the graphical user interface an input functionality for a user to define a 3D subzone within the 3D environment model, wherein the 3D subzone has a shape of a 3D body, which is spanned by a connection of at least four corner points, providing via the graphical user interface a change functionality for a user to generate a redefined subzone by dragging one of the corner points of the 3D subzone to a different position within the 3D visualization of the 3D environment model, whereby the shape of the 3D subzone is distorted, and providing to the 3D surveillance device spatial parameters associated with the redefined subzone within the 3D environment model and causing the 3D surveillance device to generate an action, particularly an alarm, in case a movement within the redefined subzone is detected by means of the 3D measurement data, the method further comprising a step of providing via the graphical user interface a snapping-in step, wherein during the dragging of the one of the corner points a relative geometric arrangement of:

the one of the corner points and/or an associated surface of the 3D subzone comprising the one of the corner points and an area, particularly a surface, of the 3D environment model is analyzed and, based thereof, a defined snapping-in arrangement of the one of the corner points or the associated surface is suggested so that the one of the corner points or the associated surface clings to the area of the 3D environment model in a defined way.

10. The method according to claim 9, wherein the snapping-in step comprises an automatic distancing of the snapping-in arrangement with respect to the area of the 3D environment model, wherein:

a user-defined minimal distance between the snapping-in arrangement with respect to the area of the 3D environment model is provided by user input via the graphical user interface, and/or the automatic distancing comprises a statistical categorization of movements associated with the area of the 3D environment model and, based thereof, provision of an automatically derived minimal distance between the snapping-in arrangement with respect to the area of the 3D environment model.

11. A system, comprising a 3D surveillance device and a computing unit, wherein the 3D surveillance device comprises the computing unit, wherein the computing unit is configured to provide data communication with the 3D surveillance device and an electronic graphical display, wherein:

the 3D surveillance device comprises a 3D coordinate measurement unit configured to capture a spatial volume of the environment by generating 3D coordinate measurement data based on a time-of-flight principle, the system, particularly the 3D surveillance device, comprises an object detector algorithm that is configured for detecting an object within a defined subarea of a monitored spatial volume of the environment based on 3D coordinate measurement data of the 3D surveillance device, particularly based on 3D change detection, and the computing unit is configured to:
    read input data associated to the 3D surveillance device, wherein the input data provide coordinate information associated to a position of the 3D surveillance device within the 3D environment model,
    provide a generation of a graphical user interface on the electronic graphical display, wherein the graphical user interface provides a 3D visualization of the 3D environment model and the 3D visualization comprises an indication of the position of the 3D surveillance device,
    provide via the graphical user interface an input functionality for a user to define a 3D subzone within the 3D environment model, wherein the 3D subzone has a shape of a 3D body, which is spanned by a connection of at least four corner points,
    provide via the graphical user interface a change functionality for a user to generate a redefined subzone by dragging one of the corner points of the 3D subzone to a different position within the 3D visualization of the 3D environment model, whereby the shape of the 3D subzone is distorted, and
    provide spatial parameters associated with the redefined subzone within the 3D environment model and cause the 3D surveillance device to generate an action, particularly an alarm, in case a movement within the redefined subzone is detected by means of the 3D measurement data,
    wherein the system is configured to carry out the method according to claim 1.

12. The system according to claim 11, wherein the 3D coordinate measurement unit is embodied as a lidar unit configured to provide the 3D coordinate measurement data by carrying out a distance measurement by emitting a laser beam and detecting returning parts of the laser beam, wherein:
    the lidar unit comprises a base, a support, and a rotating body, wherein the support is mounted on the base such that it is rotatable about a first axis and the rotating body is arranged and configured to rotate about a second axis, which is perpendicular to the first axis, and to provide for a variable deflection of an outgoing and a returning part of the laser beam, thereby providing a rotation of the laser beam about the second axis.

13. The system according to claim 11, wherein the 3D surveillance device is configured to provide at least one of selective storage, selective processing, and selective generation of the 3D coordinate measurement data as a function of the defined subarea, particularly the redefined subzone.

14. The system according to claim 12, wherein the 3D surveillance device is configured to provide at least one of selective storage, selective processing, and selective generation of the 3D coordinate measurement data as a function of the defined subarea, particularly the redefined subzone.

15. A computer program product comprising program code stored on a non-transitory computer readable medium, which, when executed by a computing unit, causes the system of claim 11 to carry out the method.

16. A system, comprising a 3D surveillance device and a computing unit, wherein the 3D surveillance device comprises the computing unit, wherein the computing unit is configured to provide data communication with the 3D surveillance device and an electronic graphical display, wherein:
    the 3D surveillance device comprises a 3D coordinate measurement unit configured to capture a spatial volume of the environment by generating 3D coordinate measurement data based on a time-of-flight principle,
    the system, particularly the 3D surveillance device, comprises an object detector algorithm that is configured for detecting an object within a defined subarea of a monitored spatial volume of the environment based on 3D coordinate measurement data of the 3D surveillance device, particularly based on 3D change detection, and the computing unit is configured to:
        read input data associated to the 3D surveillance device, wherein the input data provide coordinate information associated to a position of the 3D surveillance device within the 3D environment model,
        provide a generation of a graphical user interface on the electronic graphical display, wherein the graphical user interface provides a 3D visualization of the 3D environment model and the 3D visualization comprises an indication of the position of the 3D surveillance device,
        provide via the graphical user interface an input functionality for a user to define a 3D subzone within the 3D environment model, wherein the 3D subzone has a shape of a 3D body, which is spanned by a connection of at least four corner points,
        provide via the graphical user interface a change functionality for a user to generate a redefined subzone by dragging one of the corner points of the 3D subzone to a different position within the 3D visualization of the 3D environment model, whereby the shape of the 3D subzone is distorted, and
        provide spatial parameters associated with the redefined subzone within the 3D environment model and cause the 3D surveillance device to generate an action, particularly an alarm, in case a movement within the redefined subzone is detected by means of the 3D measurement data,
        wherein the system is configured to carry out the method according to claim 5.

17. A system, comprising a 3D surveillance device and a computing unit, wherein the 3D surveillance device comprises the computing unit, wherein the computing unit is configured to provide data communication with the 3D surveillance device and an electronic graphical display, wherein:
    the 3D surveillance device comprises a 3D coordinate measurement unit configured to capture a spatial volume of the environment by generating 3D coordinate measurement data based on a time-of-flight principle,
    the system, particularly the 3D surveillance device, comprises an object detector algorithm that is configured for detecting an object within a defined subarea of a monitored spatial volume of the environment based on 3D coordinate measurement data of the 3D surveillance device, particularly based on 3D change detection, and the computing unit is configured to:
        read input data associated to the 3D surveillance device, wherein the input data provide coordinate information associated to a position of the 3D surveillance device within the 3D environment model,
        provide a generation of a graphical user interface on the electronic graphical display, wherein the graphical user interface provides a 3D visualization of the 3D environment model and the 3D visualization comprises an indication of the position of the 3D surveillance device, provide via the graphical user interface an input functionality for a user to define a 3D subzone within the 3D environment model, wherein the 3D subzone has a shape of a 3D body, which is spanned by a connection of at least four corner points, provide via the graphical user interface a change functionality for a user to generate a redefined subzone by dragging one of the corner points of the 3D subzone to a different position within the 3D visualization of the 3D environment model, whereby the shape of the 3D subzone is distorted, and provide spatial parameters associated with the redefined subzone within the 3D environment model and cause the 3D surveillance device to generate an action, particularly an alarm, in case a movement within the redefined subzone is detected by means of the 3D measurement data, wherein the system is configured to carry out the method according to claim 6.

18. A system, comprising a 3D surveillance device and a computing unit, wherein the 3D surveillance device comprises the computing unit, wherein the computing unit is configured to provide data communication with the 3D surveillance device and an electronic graphical display, wherein:

the 3D surveillance device comprises a 3D coordinate measurement unit configured to capture a spatial volume of the environment by generating 3D coordinate measurement data based on a time-of-flight principle, the system, particularly the 3D surveillance device, comprises an object detector algorithm that is configured for detecting an object within a defined subarea of a monitored spatial volume of the environment based on 3D coordinate measurement data of the 3D surveillance device, particularly based on 3D change detection, and the computing unit is configured to:

read input data associated to the 3D surveillance device, wherein the input data provide coordinate information associated to a position of the 3D surveillance device within the 3D environment model, provide a generation of a graphical user interface on the electronic graphical display, wherein the graphical user interface provides a 3D visualization of the 3D environment model and the 3D visualization comprises an indication of the position of the 3D surveillance device, provide via the graphical user interface an input functionality for a user to define a 3D subzone within the 3D environment model, wherein the 3D subzone has a shape of a 3D body, which is spanned by a connection of at least four corner points, provide via the graphical user interface a change functionality for a user to generate a redefined subzone by dragging one of the corner points of the 3D subzone to a different position within the 3D visualization of the 3D environment model, whereby the shape of the 3D subzone is distorted, and provide spatial parameters associated with the redefined subzone within the 3D environment model and cause the 3D surveillance device to generate an action, particularly an alarm, in case a movement within the redefined subzone is detected by means of the 3D measurement data, wherein the system is configured to carry out the method according to claim 7.

19. A system, comprising a 3D surveillance device and a computing unit, wherein the 3D surveillance device comprises the computing unit, wherein the computing unit is configured to provide data communication with the 3D surveillance device and an electronic graphical display, wherein:

the 3D surveillance device comprises a 3D coordinate measurement unit configured to capture a spatial volume of the environment by generating 3D coordinate measurement data based on a time-of-flight principle, the system, particularly the 3D surveillance device, comprises an object detector algorithm that is configured for detecting an object within a defined subarea of a monitored spatial volume of the environment based on 3D coordinate measurement data of the 3D surveillance device, particularly based on 3D change detection, and the computing unit is configured to:

read input data associated to the 3D surveillance device, wherein the input data provide coordinate information associated to a position of the 3D surveillance device within the 3D environment model, provide a generation of a graphical user interface on the electronic graphical display, wherein the graphical user interface provides a 3D visualization of the 3D environment model and the 3D visualization comprises an indication of the position of the 3D surveillance device, provide via the graphical user interface an input functionality for a user to define a 3D subzone within the 3D environment model, wherein the 3D subzone has a shape of a 3D body, which is spanned by a connection of at least four corner points, provide via the graphical user interface a change functionality for a user to generate a redefined subzone by dragging one of the corner points of the 3D subzone to a different position within the 3D visualization of the 3D environment model, whereby the shape of the 3D subzone is distorted, and provide spatial parameters associated with the redefined subzone within the 3D environment model and cause the 3D surveillance device to generate an action, particularly an alarm, in case a movement within the redefined subzone is detected by means of the 3D measurement data, wherein the system is configured to carry out the method according to claim 9.

20. A computer program product comprising program code stored on a non-transitory computer readable medium, which, when executed by a computing unit, causes the system of claim 16 to carry out the method.

21. A computer program product comprising program code stored on a non-transitory computer readable medium, which, when executed by a computing unit, causes the system of claim 17 to carry out the method.

22. A computer program product comprising program code stored on a non-transitory computer readable medium, which, when executed by a computing unit, causes the system of claim 18 to carry out the method.

23. A computer program product comprising program code stored on a non-transitory computer readable medium, which, when executed by a computing unit, causes the system of claim 19 to carry out the method.

* * * * *